US005777061A

United States Patent [19]
Yonek et al.

[11] Patent Number: 5,777,061
[45] Date of Patent: Jul. 7, 1998

[54] BLOCKED POLYISOCYANATE CROSSLINKERS FOR PROVIDING IMPROVED FLOW PROPERTIES TO COATING COMPOSITIONS

[75] Inventors: Kenneth P. Yonek, McMurray, Pa.; Lanny D. Venham, Paden City, W. Va.; Philip E. Yeske; Edward P. Squiller, both of Pittsburgh, Pa.

[73] Assignee: Bayer Corporation, Pittsburgh, Pa.

[21] Appl. No.: 601,597

[22] Filed: Feb. 14, 1996

[51] Int. Cl.$^6$ ............................................ C08G 18/28
[52] U.S. Cl. .................... 528/45; 428/422.8; 428/423.1; 525/453; 528/70; 528/73
[58] Field of Search ................... 528/45, 70, 73; 428/422.8, 423.1; 525/453

[56] References Cited

U.S. PATENT DOCUMENTS

| | | | |
|---|---|---|---|
| 4,782,130 | 11/1988 | Re et al. | 528/70 |
| 4,900,800 | 2/1990 | Halpaap et al. | 528/66 |
| 4,942,164 | 7/1990 | Baum et al. | 528/70 |
| 4,994,542 | 2/1991 | Matsuda et al. | 528/70 |
| 5,045,624 | 9/1991 | Falk et al. | 528/70 |
| 5,112,931 | 5/1992 | Potter et al. | 528/45 |
| 5,185,421 | 2/1993 | Cohen et al. | 528/70 |
| 5,189,135 | 2/1993 | Cozzi et al. | 528/70 |
| 5,232,988 | 8/1993 | Venham et al. | 528/45 |
| 5,280,100 | 1/1994 | Venham | 528/45 |
| 5,461,135 | 10/1995 | Malofsky et al. | 528/73 |
| 5,508,337 | 4/1996 | Wamprecht et al. | 428/423.1 |
| 5,508,370 | 4/1996 | Reiff et al. | 528/45 |

*Primary Examiner*—John M. Cooney, Jr.
*Attorney, Agent, or Firm*—Joseph C. Gil; Thomas W. Roy

[57] ABSTRACT

The present invention is directed to a powder coating composition containing as binder A) a polyisocyanate component which contains blocked isocyanate groups, is present in powder form, is solid below 40° C. and liquid above 150° C., and contains one or more polyisocyanates
  i) having a blocked NCO content (calculated as NCO, MW 42) of 5 to 25% by weight and
  ii) containing fluorine (calculated as F, AW 19) in an amount of 0.01 to 20% by weight, wherein the preceding percentages are based on the solids content of the polyisocyanate mixture and B) a polyhydroxyl component containing one or more high molecular weight polyols.

20 Claims, 2 Drawing Sheets ered in the compositions of the present invention are

BLOCKED POLYISOCYANATE CROSSLINKERS FOR PROVIDING IMPROVED FLOW PROPERTIES TO COATING COMPOSITIONS

BACKGROUND OF THE INVENTION

1. Field of the Invention

The present invention is directed to new fluorine-containing polyisocyanate crosslinkers for powder coating compositions which improve the flow of the coating compositions during cure, thereby improving the appearance of the cured films.

2. Description of the Prior Art

Powder coating compositions containing polyisocyanate crosslinkers and an isocyanate-reactive component, preferably a polyester or polyacrylate polyol, are known and described, for example, in U.S. Pat. Nos. 4,900,800 and 5,091,475. While powder coating compositions possess many advantages, one of the characteristics of these compositions is that it can be difficult to obtain coatings having an acceptable surface appearance. As the temperature rises during the curing process, the components of the coating composition melt to form a liquid, which gradually decreases in viscosity as the temperature of the composition is increased further. Once the temperature is reached at which crosslinking takes place, i.e., the unblocking temperature, the viscosity of the coating composition rapidly increases due to the reaction between the components and the resulting build up of the molecular weight. In accordance with the present invention the "unblocking temperature" is the temperature at which the blocking agent no longer prevents a reaction from occurring between the two reactive components.

The period of time from when the viscosity is at or near its minimum to the time when the viscosity increases due to the reaction of the components is referred to as the "open time." If the open time of the coating composition is not sufficiently long and/or does not occur at a sufficiently low viscosity for the compositions to level out and form a smooth coating, then the surface appearance of the resulting coating may not be acceptable.

Because the starting components of powder coating compositions must be solid at room temperature and preferably remain solid at temperatures below 50° C., the minimum viscosity generally occurs at a temperature of 160° to 180° C. This is disadvantageous because it necessitates the use of blocking agents that have unblocking temperatures higher than these temperatures. If the unblocking temperature is reached and crosslinking begins at lower temperatures, then the components will begin to react and the viscosity of the composition may increase before the components have a chance to flow out and form a smooth coating.

In order to use blocking agents that have lower unblocking temperatures, it is necessary to reduce the temperature at which the minimum viscosity occurs and/or increase the open time. This is difficult to accomplish since attempts to increase the open time or reduce the temperature at which the viscosity minimum occurs by lowering the viscosities of the starting components would also be expected to reduce the melting temperatures of the components, which may render them unacceptable for use in powder coatings. Above all, these components must be solid at room temperature and at slightly higher temperatures. Otherwise the coating compositions will not possess good storage stability.

Accordingly, it is an object of the present invention to increase the open time and/or to reduce the minimum viscosity during open time such that it is possible for the components of the coating composition to flow together to form a coating having an acceptable surface appearance. It is an additional object of the present invention to provide compositions that reach their minimum viscosity at a low enough temperature such that an acceptable surface appearance is obtained even when using blocking agents that have lower unblocking temperatures. It is a further object of the present invention to achieve the preceding objectives without significantly reducing the melting point of the starting materials.

Surprisingly, these objects may be achieved with the fluorine-containing polyisocyanate crosslinkers according to the present invention, which are described in detail hereinafter. When used in powder coating compositions, these crosslinkers not only increase the open time of the coating composition, but also reduce the temperature at which the open time and the minimum viscosity occur.

The use of fluorine-containing polyisocyanates, optionally in blocked form, in one- and two-component coating compositions has been disclosed in copending applications, U.S. Ser. Nos. 08/306,553 and 08/359,777. However, these applications do not specifically refer to powder coatings and do not teach or suggest that the objectives of the present invention could be achieved by the use of such polyisocyanates.

SUMMARY OF THE INVENTION

The present invention is directed to a powder coating composition containing as binder A) a polyisocyanate component which contains blocked isocyanate groups, is present in powder form, is solid below 40° C. and liquid above 150° C., and contains one or more polyisocyanates i) having a blocked NCO content (calculated as NCO, MW 42) of 5 to 25% by weight and ii) containing fluorine (calculated as F, AW 19) in an amount of 0.01 to 20% by weight, wherein the preceding percentages are based on the solids content of the polyisocyanate mixture and B) a polyhydroxyl component containing one or more high molecular weight polyols.

DETAILED DESCRIPTION OF THE INVENTION

Figure 1:
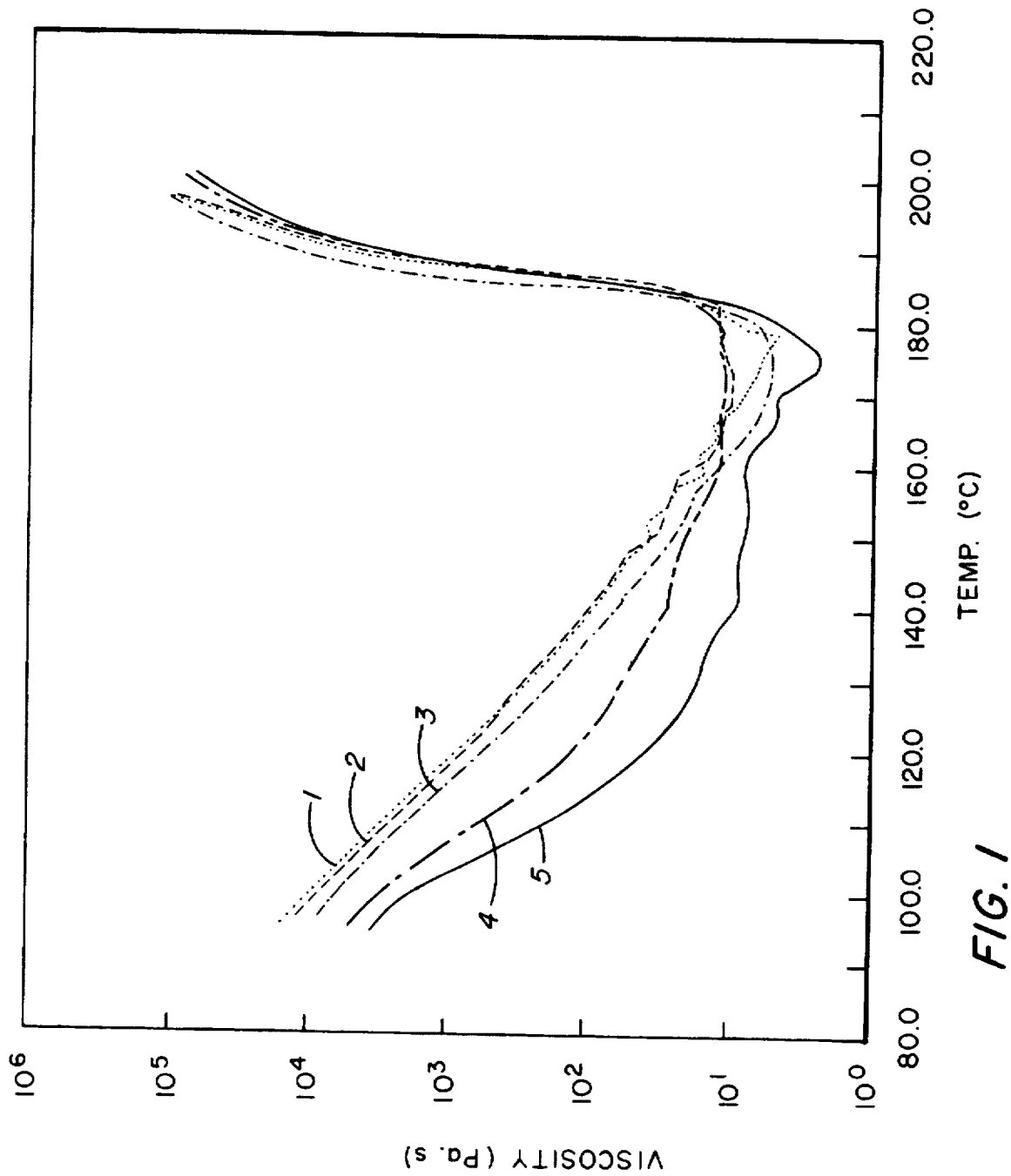
FIG. 1 is a graph showing a plot of viscosity vs. time for the powder coating compositions prepared in Examples 1–5.

In accordance with the present invention the term "(cyclo) aliphatically bound isocyanate groups" means aliphatically and/or cycloaliphatically bound isocyanate groups. The term "monoalcohol" means a compound containing one aliphatically, cycloaliphatically, araliphatically or aromatically bound hydroxyl group.

The blocked polyisocyanates according to the present invention are prepared from polyisocyanates, fluorine-containing hydroxy compounds and blocking agents. The blocked polyisocyanates have a melting temperature or glass transition temperature of 40° to 150° C., preferably 50° to 120° C. and more preferably 50° to 100° C.; an average blocked isocyanate functionality of 2 to 7, preferably 2 to 4 and more preferably 2.2 to 3.3; and an average blocked isocyanate group content (calculated as NCO, MW 42), based on the total weight of the blocked polyisocyanate, of 5 to 25, preferably 8 to 20 and more preferably 10 to 18.

Suitable polyisocyanates for preparing the blocked polyisocyanates include organic diisocyanates represented by the formula

R(NCO)$_2$ wherein R represents an organic group obtained by the removing the isocyanate groups from an organic diisocyanate having aromatically or preferably (cyclo)aliphatically bound isocyanate groups and a molecular weight of 140 to 400. Preferred diisocyanates for the process according to the invention are those represented by the above formula wherein R represents a divalent aliphatic hydrocarbon group having from 4 to 18 carbon atoms, a divalent cycloaliphatic hydrocarbon group having from 5 to 15 carbon atoms, a divalent aromatic hydrocarbon group having 6 to 15 carbon atoms or a divalent araliphatic hydrocarbon group having from 7 to 15 carbon atoms. Especially preferred are diisocyanates containing cyclic groups since when present in blocked form these diisocyanates result in blocked polyisocyanates having sufficiently high melting points for use in powder coating compositions.

Examples of organic diisocyanates suitable for the present invention include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanato-methyl-3,5,5-trimethylcyclohexane (isophorone diisocyanate or IPDI), 4,4'-and/or 2,4'-diisocyanato-dicyclohexylmethane, 1,3- and 1,4-bis(isocyanato-methyl)-cyclohexane, bis-(4-isocyanato-3-methyl-cyclohexyl)-methane, xylylene diisocyanate, α,α, α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 2,4- and/or 2,6-toluene diisocyanate, 2,4- and/or 4,4'-diphenylmethane diisocyanate. Mixtures of these diisocyanates may also be used. Particularly preferred diisocyanates are 1,6-hexamethylene diisocyanate, isophorone diisocyanate and bis-(4-isocyanato-cyclohexyl)methane.

Instead of using the preceding monomeric polyisocyanates to prepare the blocked polyisocyanates according to the invention, it is also possible to use polyisocyanate adducts. Suitable polyisocyanate adducts are prepared from the monomeric diisocyanates and contain isocyanurate, uretdione, biuret, urethane, allophanate, carbodiimide and/or oxadiazinetrione groups. The polyisocyanate adducts have an average functionality of 2 to 6 and an NCO content of 5 to 30% by weight. 1) Isocyanurate group-containing polyisocyanates include those set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 2 to 3.5 and an NCO content of 5 to 30%, preferably 10 to 25% and most preferably 15 to 25% by weight. The lower functionalities are obtained by not removing unreacted diisocyanate starting material or by the addition of diisocyanates after completion of the trimerization reaction.

2) Uretdione diisocyanates may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates may be prepared according to the processes disclosed in U.S. Pat. Nos. 3,124,605; 3,358,010; 3,644,490; 3,862,973; 3,903,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates may be prepared in accordance with the process disclosed in U.S. Pat. No. 3,183,112 by reacting excess quantities of polyisocyanates, preferably diisocyanates, with glycols and higher functional polyols having molecular weights of less than 400, such as trimethylol propane, glycerine, 1,2-dihydroxy propane and mixtures thereof. The urethane group-containing polyisocyanates have a most preferred NCO content of 10 to 20% by weight and an (average) NCO functionality of 2 to 3.

5) Allophanate group-containing polyisocyanates may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates may be prepared in accordance with the processes set forth in U.S. Pat. Nos. 5,124,427, 5,208,334, 5,235,018 and 5,444,146; the disclosures of which are herein incorporated by reference.

7) Carbodiimide group-containing polyisocyanates may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups are based on the reaction product of two moles of a diisocyanate and one mole of carbon dioxide.

Preferred polyisocyanate adducts are the polyisocyanates containing isocyanurate groups, biuret groups or mixtures of isocyanurate and allophanate groups.

In accordance with the present invention fluorine is introduced into the polyisocyanates by reacting a portion of the isocyanate groups with compounds containing two or more carbon atoms, one or more isocyanate-reactive groups (preferably one or two isocyanate-reactive groups, more preferably one isocyanate-reactive group) and one or more fluorine atoms (preferably in the form of —CF$_2$— groups). Examples of suitable isocyanate-reactive groups include primary amino groups, secondary amino groups and preferably hydroxyl groups. These groups react with isocyanate groups to form urethane groups (which are preferably converted to allophanate groups) or urea groups.

Examples of these compounds include aliphatic, cycloaliphatic, araliphatic or aromatic isocyanate-reactive compounds, which contain two or more carbon atoms and also contain fluorine atoms, preferably fluoroalkyl groups. The compounds may be linear, branched or cyclic and have a molecular weight (number average molecular weight as determined by gel permeation chromatography using polystyrene as standard) of up to 50,000, preferably up to 10,000, more preferably up to 6000 and most preferably up to 2000. These compounds generally have OH or NH numbers, preferably OH numbers of greater than 5, preferably greater than 25 and more preferably greater than 35. These compounds may optionally contain other hetero atoms in the form of, e.g., ether groups, ester groups, carbonate groups, acrylic groups, etc.

Thus, it is possible in accordance with the present invention to use the known isocyanate-reactive compounds, preferably polyols from polyurethane chemistry, provided that they contain fluorine, e.g. by using fluorine-containing alcohols, amines, acids, unsaturated monomers, etc. in the preparation of these polyols. Examples of polyols and polyamines, which may be prepared from fluorine-containing precursors and used in accordance with the present invention, are disclosed in U.S. Pat. No. 4,701,480, the disclosure of which is herein incorporated by reference. Additional examples of suitable fluorine-containing compounds are disclosed in U.S. Pat. Nos. 5,294,662 and 5,254,660, the disclosures of which are herein incorporated by reference.

Preferred for use according to the invention are compounds containing one or more hydroxyl groups, preferably one or two hydroxyl groups and more preferably one hydroxyl group; one or more fluoroalkyl groups; optionally one or more methylene groups; and optionally other hetero atoms such as ether groups. These compounds preferably have a molecular weight of less than 2000 or a hydroxyl number of greater than 35.

To prepare the blocked polyisocyanates according to the invention the minimum ratio of fluorine-containing compounds to polyisocyanate starting material, i.e., either monomeric diisocyanate or polyisocyanate adduct is about 0.01 millimoles, preferably about 0.1 millimoles and more preferably about 1 millimole of fluorine-containing compounds for each mole of diisocyanate. The maximum amount of fluorine-containing compounds to diisocyanate is about 500 millimoles, preferably about 100 millimoles and more preferably about 20 millimoles of fluorine-containing compounds for each mole of diisocyanate. The amount of the monoalcohol is selected such that the resulting polyisocyanate mixture contains a minimum of 0.01 % by weight, preferably 0.02% by weight, more preferably 0.05% by weight and most preferably 0.1% by weight, of fluorine (AW 19), based on solids, and a maximum of 20% by weight, preferably 10% by weight, more preferably 7% and most preferably 3% by weight of fluorine (AW 19), based on solids.

In addition to the previously described compounds containing fluorine groups, other monoalcohols and/or polyols which do not contain fluorine groups may also be used to adjust the properties of the final products. For example, monoalcohols which do not contain fluorine may also be used to adjust the properties of the final products. Suitable monoalcohols of this type have been disclosed in U.S. Pat. Nos. 5,124,427, 5,208,334, 5,235,018 and 5,444,146, the disclosures of which have previously been incorporated by reference. Examples of suitable monoalcohols include methanol, ethanol, n-propanol, isopropanol, n-butanol, isobutanol and tert. butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, cyclohexanol, benzyl alcohol, phenol, the cresols, the xylenols, the trimethylphenols, decanol, dodecanol, tetradecanol, hexadecanol, octadecanol, 2,6,8-trimethylnonanol, 2-t-butyl-cyclohexanol, 4-cyclohexyl-1-butanol, 2,4,6,-trimethyl benzyl alcohol, branched chain primary alcohols and mixtures thereof (which are available from Henkel under the Standamul trademark) and mixtures of linear primary alcohols (which are available from Shell under the Neodol trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuralcohol and other monoalcohols which have a molecular weight of up to 2000 and are prepared from ethylene oxide, propylene oxide and/or butylene oxide.

It is also possible in accordance with the present invention to use mixtures of the previously described monoalcohols.

The blocked polyisocyanate adducts according to the present invention may be prepared in accordance with several embodiments. For example, the monomeric diisocyanates or polyisocyanates adducts may be reacted with the compounds containing fluorine and hydroxy or amino groups to incorporate fluorine through the formation of urethane or urea groups. It may be necessary, especially when using monomeric diisocyanates as the starting material, to use fluorine-containing compounds having more than one isocyanate-reactive group to obtain the required functionalities.

While it is possible as previously disclosed to form the polyurethane adducts prior to incorporating fluorine, it is also possible to incorporate fluorine prior to or during the formation of the polyisocyanate adducts. For example, the compounds containing fluorine can be initially reacted with isocyanate groups to form urethane groups and subsequently these urethane groups can be converted to allophanate groups, optionally in the presence of a trimerization catalyst.

Suitable methods for preparing the allophanate group containing polyisocyanates are known and described in U.S. Pat. Nos. 3,769,318, 4,160,080 and 4,177,342 and 4,738,991, the disclosures of which are herein incorporated by reference. The allophanatization reaction may be conducted at a temperature of 50° to 250° C., preferably 60° to 150° C. The reaction may be terminated by reducing the reaction temperature, by removing the catalyst, e.g., by applying a vacuum, or by the addition of a catalyst poison. After the reaction is terminated, unreacted monomeric diisocyanates may be removed, e.g., by thin film evaporation.

The allophanatization of the starting diisocyanate mixture may be carried out in the absence or in the presence of solvents which are inert to isocyanate groups. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

Instead of just using catalysts that promote the formation of allophanate groups, it is also possible in accordance with the present invention to also use catalysts that promote the formation of isocyanurate groups, or to use catalysts that promote the formation of allophanate groups and isocyanurate groups. Suitable methods and catalysts for the preparation of polyisocyanates containing isocyanurate groups and allophanate groups are known and described in U.S. Pat. Nos. 5,124,427, 5,208,334, 5,235,018 and 5,444,146, the disclosures of which are herein incorporated by reference. The trimerization of the starting diisocyanate mixture may be carried out in the absence or in the presence of solvents which are inert to isocyanate groups, such as those previously described.

The reaction temperature for isocyanurate and allophanate formation in accordance with the present invention is about 10° to 160° C., preferably about 50° to 150° C. and more preferably about 70° to 120° C.

The process according to the invention may take place either batchwise or continuously, for example, as described below. The starting diisocyanate is introduced with the exclusion of moisture and optionally with an inert gas into a suitable stirred vessel or tube and optionally mixed with a solvent which is inert to isocyanate groups such as toluene, butyl acetate, diisopropylether or cyclohexane. The previously described fluorine-containing compounds and optionally alcohols may be introduced into the reaction vessel in accordance with several embodiments. They may be prereacted with the starting diisocyanate to form urethane groups and optionally urea groups prior to introducing the diisocyanates into the reaction vessel; they may be mixed with the diisocyanates and introduced into the reaction vessel; they may be separately added to the reaction vessel either before or after, preferably after, the diisocyanates are added; or the catalyst may be dissolved in these compounds prior to introducing the solution into the reaction vessel.

At a temperature of about 50° C. and in the presence of the required catalyst or catalyst solution the allophanatization reaction begins and is indicated by an exothermic reaction. When catalysts for the formation of allophanate groups and isocyanurate groups are present, it is possible to control the rate of formation of the these two groups. As the reaction temperature increases the conversion rate of urethane groups to allophanate groups increases faster than the formation of isocyanurate groups. Accordingly, by varying the reaction temperature, it is possible to obtain different ratios of allophanate groups to isocyanurate groups.

The progress of the reaction is followed by determining the NCO content by a suitable method such as titration, refractive index or IR analysis. Thus, the reaction may be terminated at the desired degree of allophanatization. The termination of the allophanatization reaction can take place, for example, after the NCO content has fallen by 5 to 80% by weight, preferably 10 to 60% by weight and more preferably 20 to 50% by weight, based on the initial isocyanate group content of the diisocyanate starting material.

In general, when the reaction is terminated at a high NCO content, i.e., before the NCO content has been reduced significantly, the resulting polyisocyanate mixture after removal of unreacted starting diisocyanate will have a low viscosity. To the contrary if the reaction is terminated at a low NCO content, i.e., after the NCO content has fallen significantly, then the resulting product will have a higher viscosity due to the formation of polyisocyanurates and other higher molecular weight by-products of the isocyanurates and allophanates which are initially formed. This is especially true with regard to the known aliphatic diisocyanate starting materials. Cyclic diisocyanates result in extremely high viscosity products or solids after removal of unreacted monomer regardless of when the reaction is terminated.

The termination of the allophanatization and optionally trimerization reactions can take place, for example, by the addition of a catalyst poison of the type named by way of example in the above-mentioned literature references. For example, when using basic catalysts the reaction is terminated by the addition of a quantity, which is at least equivalent to the catalyst quantity, of an acid chloride such as benzoyl chloride. When using heat-labile catalysts, for example, certain quaternary ammonium hydroxides, poisoning of the catalyst by the addition of a catalyst-poison may be dispensed with, since these catalysts decompose in the course of the reaction. The use of suspended catalysts is also possible. These catalysts are removed after achieving the desired degree of trimerization by filtering the reaction mixture.

The working-up of the reaction mixture, optionally after previous separation of insoluble catalyst constituents, may take place in various ways depending upon how the reaction was conducted and the area of application for the isocyanates. Any solvent used during the reaction and any unreacted monomer present in the polyisocyanate product may be removed by distillation in known manner. The product obtained after distillation generally contains a total of less than 2% by weight, preferably less than 1% by weight, based on the solids content of the polyisocyanate mixture, of free (unreacted) monomeric diisocyanates. Products in which unreacted monomer has not been removed or products to which additional monomeric diisocyanates have been added are also suitable for use in accordance with the present invention.

The products according to the invention range from low viscosity liquids having a viscosity of 200 mPa.s to high viscosity liquids to solids.

The low viscosity products are generally obtained from aliphatic diisocyanate starting materials, such as 1,6-hexamethylene diisocyanate and have a viscosity of less than 5000, preferably less than 2000 and more preferably less than 1300 mPa.s. High viscosity products may also be obtained from these diisocyanates, but the reaction is terminated at a significantly lower NCO content. The high viscosity products have a minimum viscosity of 5000, preferably 12,000 and more preferably 15,000 to 70,000 mPa.s and a maximum viscosity of 100,000, preferably 90,000 and more preferably 70,000 mPa.s. The viscosities are determined at 25° C. on samples having a solids content of 100% and containing less than 2% by weight of unreacted monomer. Extremely highly viscous to solid products are generally obtained from cyclic diisocyanates such as isophorone diisocyanate, bis-(4-isocyanato-cyclohexyl)-methane or the previously described aromatic diisocyanates.

The polyisocyanate mixtures according to the invention have an isocyanurate group content (calculated as $N_3.C_3.O_3$, MW 126) of up to 25% by weight, preferably up to 20% by weight. When using allophanatization/trimerization catalysts, the polyisocyanate mixtures will generally have an isocyanurate group content of at least 5%, preferably at least 10% by weight. Even when using highly selective allophanatization catalysts, minor quantities of isocyanurate groups are formed.

The polyisocyanate mixtures, which are prepared from aliphatic, cycloaliphatic or araliphatic diisocyanate starting materials, especially the low viscosity products prepared from aliphatic diisocyanate starting materials, may be almost colorless, i.e., they have a yellowness index as measured on the APHA color scale of 10 to 200, preferably 30 to 150 and more preferably 50 to 100.

In the low viscosity products prepared from aliphatic diisocyanate starting materials using allophanatization/trimerization catalysts, the ratio of monoisocyanurate groups to mono-allophanate groups in the polyisocyanates according to the invention is about 10:1 to 1:10, preferably about 5:1 to 1:7. These values may be determined by gel permeation chromatography (GPC) by determining the areas under the peaks for the monoisocyanurate and monoallophanate groups. In accordance with the present invention the term "monoisocyanurate" means a polyisocyanate containing one isocyanurate group and formed from three diisocyanate molecules, and the term "polyisocyanurate" means a polyisocyanate containing more than one isocyanurate group. The term "monoallophanate" means a polyisocyanate containing one allophanate group and formed from two diisocyanate molecules and 1 monoalcohol molecule, and the term "polyallophanate" means a polyisocyanate containing more than one allophanate group.

The preferred products according to the present invention are polyisocyanates containing allophanate groups and fluorine, preferably in the form of fluoroalkyl groups (—$CF_2$—) and optionally isocyanurate groups. The products may also contain residual urea groups and also urethane groups which are not converted to allophanate groups depending upon the temperature maintained during the reaction and the degree of isocyanate group consumption. When urethane or urea groups are present it is preferred that the number of equivalents of allophanate groups exceeds the number of equivalents of urethane and urea groups and, more preferably, that the polyisocyanate contains sufficient allophanate groups to ensure that it remains stable and homogeneous in storage for 3 months at 25° C. If the polyisocyanate mixture contains an insufficient number of allophanate groups, the mixture may be cloudy and a gradual settling of insoluble constituents may take place during storage.

To achieve the required content of urethane, urea and allophanate groups, it is preferred to convert at least 50%, more preferably at least 70% and most preferably at least 90% of the urethane groups formed from the fluorine-containing hydroxyl compounds to allophanate groups. However, it may not be necessary to convert the urethane groups formed from the fluorine-containing hydroxyl compounds to allophanate groups when the polyisocyanate mixture contains allophanate groups formed from non-fluorine-containing monoalcohols as previously discussed.

In accordance with another embodiment of the present invention, the polyisocyanates containing fluorine, preferably allophanate groups and optionally isocyanurate groups may be blended with other known polyisocyanates, e.g., polyisocyanate adducts containing biuret, isocyanurate, allophanate, urethane, urea, carbodiimide, and/or uretdione groups. The amount of the polyisocyanate containing fluorine that must be blended with these other polyisocyanates is dependent upon the fluorine content of the polyisocyanates according to the invention.

To obtain the advantageous melt viscosities according to the present invention, the resulting polyisocyanate blends should contain a minimum of 0.01% by weight, preferably 0.02% by weight, more preferably 0.05% by weight and most preferably 0.1% by weight, of fluorine (AW 19), based on solids, and a maximum of 20% by weight, preferably 10% by weight, more preferably 7% by weight and most preferably 3% by weight of fluorine (AW 19), based on solids. By knowing the fluorine content of the polyisocyanate mixtures according to the invention and the desired fluorine content of the resulting polyisocyanate blends, the relative amounts of the polyisocyanate mixtures and the other polyisocyanates may be readily determined.

In accordance with the present invention any of the polyisocyanate mixtures according to the invention can be blended with other polyiscyanates. However, preferably the polyisocyanate mixtures to be blended have a minimum fluorine content of 5% by weight, preferably 10% by weight and more preferably 20% by weight, and a maximum fluorine content of 50% by weight, preferably 45% by weight. These so-called "concentrates" may then be blended with other polyisocyanates to form polyisocyanate blends that may be used to prepare coating compositions having the advantageous melt viscosities in accordance with the present invention.

Either before, during or after preparation of the polyisocyanates containing fluorine, these products are blocked with reversible blocking agents for isocyanate groups. The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as ε-caprolactam and δ-valerolactam; pyrazoles such as 3,5-dimethyl pyrazole; oximes such as butanone oxime, methyl amyl ketoxime and cyclohexanone oxime; mercaptans such as methyl mercaptan, ethyl mercaptan, butyl mercaptan, 2-mercaptobenzthiazole, α-naphthyl mercaptan and dodecyl mercaptan; and triazoles such as 1H-1,2,4-triazole.

To prepare the one-component coating compositions according to the present invention, the blocked polyisocyanates are used in combination with high molecular weight polyols having number average molecular weights of 400 to 50,000, preferably 500 to 30,000 and more preferably 500 to 20,000. The average molecular weights are determined by GPC using polystyrene as the standard. Examples of these high molecular weight polyols include polyhydroxy polyesters, polyhydroxy polyethers, polyhydroxy polyacrylates, polyhydroxy polylactones, polyhydroxy polyurethanes, polyhydroxy polyepoxides and optionally low molecular weight, polyhydric alcohols known from polyurethane coatings technology. Especially preferred are the polyester and polyacrylate polyols. Examples of these polyols are disclosed in U.S. Pat. No. 4,701,480 and U.S. Pat. No. 5,091,475, the disclosures of which are herein incorporated by reference. Also suitable are amino-functional co-reactants, such as the aspartate esters disclosed in U.S. Pat. No. 5,126,160, herein incorporated by reference.

To prepare the coating compositions the amount of the polyisocyanate component and the high molecular polyol are selected to provide an equivalent ratio of blocked isocyanate groups to hydroxy groups of about 0.8 to 3, preferably about 0.9 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methyl-piperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

The coating compositions containing the blocked polyisocyanates according to the invention provide coatings which have good cure times, and are particularly light-fast, color-stable in the presence of heat and very resistant to abrasion. Furthermore, they are characterized by high hardness, elasticity, very good resistance to chemicals, high gloss, good weather resistance, good environmental etch resistance and good pigmenting qualities. Above all, the coating compositions have an excellent surface appearance and excellent cleanability.

The invention is further illustrated, but is not intended to be limited by the following examples in which all parts and percentages are by weight unless otherwise specified.

EXAMPLES

Alcohol 1

A perfluorinated polypropylene oxide, EO-capped monoalcohol, MW 757 (available from Ausimont as Galden-TX).

Polyisocyanate 1

A round bottom flask was charged with 9000 g (68.6 equivalents) of 4,4'-diisocyanato-dicyclohexylmethane. A nitrogen inlet tube was inserted into the flask, and a slow stream of nitrogen was bubbled through the material for at least 30 minutes. The flask was heated to 70° C., and then 9.0 grams of a catalyst solution were added in portions. The catalyst solution was prepared by mixing 50.0 g of a 40% benzyltrimethylammonium hydroxide solution in methanol with 50.0 g of 1-butanol. The temperature rose due to the exothermic reaction. The temperature was maintained between 70° and 80° C. until the desired isocyanate content of 24.0% was obtained. The reaction took approximately 3.5 hours. When the desired isocyanate content was achieved, 9.9 g of di-(2-ethylhexyl)-phosphate were added to inactivate the catalyst. The product had an isocyanate content of 23.5% as determined by titration. 667.0 g of 4,4'-diisocyanato-dicyclohexyl-methane were added to adjust the isocyanate content to 24.0% by titration. The resulting product had a viscosity of about 58,000 mPa.s at 25° C. and a fluorine content of 0%.

Polyisocyanate 2

A round bottom flask was charged with 1000.0 g (7.62 equivalents) of 4,4'-diisocyanato-dicyclohexylmethane. A nitrogen inlet tube was inserted into the flask, and a slow stream of nitrogen was bubbled through the material for at least 30 minutes. The flask was heated to 70° C., and then 1.0 gram of the catalyst solution used for the preparation of Polyisocyanate I was added in portions. The temperature rose due to the exothermic reaction. A temperature between 70° and 80° C. was maintained until the desired isocyanate content of 28.0% was obtained. The reaction took approximately one hour. When the desired isocyanate content was achieved, 0.38 g of di-(2-ethylhexyl)-phosphate were added to inactivate the catalyst. The resulting polyisocyanate had an isocyanate content of 27.85% as determined by titration, a viscosity of 315 mPa.s at 25° C. and a fluorine content of 0%.

Polyisocyanate 3

A round bottom flask was charged with 600 g (4.57 equivalents of 4,4'-diisocyanato-dicyclohexylmethane and 3.0 g (0.004 equivalents) of Alcohol 1. A nitrogen inlet tube was inserted into the flask, and a slow stream of nitrogen was bubbled through the material for at least 30 minutes. The flask was heated to 70° C., and then 0.8 grams of the catalyst solution used for the preparation of Polyisocyanate 1 were added in portions. The temperature rose due to the exothermic reaction. A temperature between 70° and 80° C. was maintained until the desired isocyanate content of 25.0% was obtained. The reaction took approximately one hour. When the desired isocyanate content was achieved, 0.12 g of di-(2-ethylhexyl)-phosphate were added to inactivate the catalyst. The resulting polyisocyanate had an isocyanate content of 25.0% as determined by titration, a viscosity of 7330 mPa.s at 25° C. and a fluorine content of 0.257%.

Polyisocyanate 4

A round bottom flask was charged with 600 g (4.57 equivalents) of 4,4'-diisocyanato-dicyclohexylmethane and 6.0 g (0.008 equivalents) of Alcohol 1. A nitrogen inlet tube was inserted into the flask, and a slow stream of nitrogen was bubbled through the material for at least 30 minutes. The flask was heated to 70° C., and then 1.0 gram of the catalyst solution used for the preparation of Polyisocyanate 1 was added in portions. The temperature rose due to the exothermic reaction. A temperature between 70° and 80° C. was maintained until the desired isocyanate content of 25.0% was obtained. The reaction took approximately 1.5 hours. When the desired isocyanate content was achieved, 0.20 g of di-(2-ethylhexyl)-phosphate were added to inactivate the catalyst. The resulting polyisocyanate had an isocyanate content of 25.0% as determined by titration and a viscosity of 7030 mPa.s at 25° C. and a fluorine content of 0.512%.

Polyisocyanate 5

An isocyanurate group-containing polyisocyanate prepared from 1,6-hexamethylene diisocyanate and having an isocyanate content of 21.65%, a content of monomeric diisocyanate of <0.2%, a viscosity at 25° C of 3000 mPa.s (available from Bayer Corporation as Desmodur N 3300) and a fluorine content of 0%.

Polyisocyanate 6

To a 3-neck flask equipped with a gas bubbler, mechanical stirrer, thermometer and condenser were added 100 parts of 1,6-hexamethylene diisocyanate and 0.6 parts of Alcohol 1. Dry nitrogen was bubbled through the stirred reaction mixture while it was heated at 90° C. After about 45 minutes 70 ppm, based on the weight of the reaction mixture, of a 5% solution of trimethylbenzyl-ammonium hydroxide dissolved in 1-butanol was added in portion over a period of 90 minutes. When the NCO content reached 41.4%, the reaction was stopped by adding 1.1 equivalents (based on catalyst solution) of a 25% solution of di(2-ethylhexyl) phosphate dissolved in HDI. The excess monomer was removed by thin film evaporation to provide a polyisocyanate having an isocyanate content of 21.4%, a viscosity of 1628 mPa.s at 25° C., a free monomer content of 0.08% HDI and a fluorine content of 0.615%.

Blocked Polyisocyanate 1-Comparison

300.0 g of Polyisocyanate 1 were charged into a round bottom flask. The flask was heated to 120° C., 67.9 g of ε-caprolactam were added under a nitrogen blanket and the mixture was stirred. After about ½ hour, an additional 67.9 g of ε-caprolactam were added. After another ½ hour a final portion of 67.9 g of ε-caprolactam were added. The flask was heated to 135° C. for one hour and then the molten material was poured onto an aluminum tray to cool. The solid material was ground into a fine powder. The final product had a blocked isocyanate content of 14.3%, an equivalent weight of 294 and a fluorine content of 0%.

Blocked Polyisocyanate 2-Comparison

100.0 g (0.571 equivalents) of Polyisocyanate 1 and 100.0 g (0.663 equivalents) of Polyisocyanate 2 were charged into a round bottom flask. The mixture had a viscosity of about 2,900 mPa.s at 25° C. 146.6 g (1.29 equivalents) of ε-caprolactam were then added and the resulting mixture was heated to 120° to 140° C. After heating and stirring for 3 hours, the molten material was poured onto an aluminum tray to cool. The solid material was then ground into a fine powder. The final product had a blocked isocyanate content of 14.95%, an equivalent weight of 280.9 and a fluorine content of 0%.

Blocked Polyisocyanate 3-Comparison

200.0 g of Polyisocyanate 2 were charged into a round bottom flask. 157.6 g (1.393 equivalents) of ε-caprolactam were then added and the resulting mixture was heated to 120° to 140° C. After heating and stirring for 3 hours, the molten material was poured onto an aluminum tray to cool. The solid material was then ground into a fine powder. The final product had a blocked isocyanate content of 15.58%, an equivalent weight of 269.5 and a fluorine content of 0%.

Blocked Polyisocyanate 4-According to the invention 250.0 g (1.488 equivalents) of Polyisocyanate 3 and 176.8 g (1.562 equivalents) of ε-caprolactam were charged into a round bottom flask. The mixture was then heated to 120° to 140° C. After heating and stirring for 3 hours, the molten material was poured onto an aluminum tray to cool. The solid material was then ground into a fine powder. The final product had a blocked isocyanate content of 14.64%, an equivalent weight of 286.8 and a fluorine content of 0.15%.

Blocked Polyisocyanate 5-According to the invention 250.0 g (1.488 equivalents) of Polyisocyanate 3 and 176.8 g (1.562 equivalents) of ε-caprolactam were charged into a round bottom flask. The mixture was then heated to 120° to 140° C. After heating and stirring for 3 hours, the molten material was poured onto an aluminum tray to cool. The solid material was then ground into a fine powder. The final product had a blocked isocyanate content of 14.64%, an equivalent weight of 286.8 and a fluorine content of 0.30%.

Blocked Polyisocyanate 6-Comparison 100.0 g (0.515 equivalents) of Polyisocyanate 5 and 1000 g of ethyl acetate were charged into a round bottom flask. 37.4 g (0.541 equivalents) of 1,2,4-triazole was then added and the resulting slurry was heated reflux (78° C.) for three hours. The clear solution was allowed to cool and became turbid. The material was then poured into an aluminum tray to cool. After the solvent evaporated, the solid material was dried in a vacuum oven at 50° C. The solid material was then ground into a fine powder. The final product had a blocked isocyanate content of 15.74%, an equivalent weight of 266.8, a melting point of about 94° C. (softening began at 85° C.) and a fluorine content of 0%.

Blocked Polyisocyanate 7-According to the invention 51.15 g (0.26 equivalents) of Polyisocyanate 6 and 280.0 g of ethyl acetate were charged into a round bottom flask. 18.8 g (0.27 equivalents) of 1,2,4-triazole was then added and the resulting slurry was heated reflux (78° C.) for six hours. The clear solution was allowed to cool. After two days the precipitated solids were filtered from the slurry. The solid material was dried in a vacuum oven at 50° C. and then ground into a fine powder. The final product had a blocked isocyanate content of 15.61%, an equivalent weight of 269.0 and a fluorine content of 0.45%.

Polyol 1

A hydroxy functional polyacrylate having an OH equivalent weight of 708, available from Bayer Corp. as Crelan LS-2995.

Catalyst Dabco T-12

Dibutyl tin dilaurate (Dabco T-12, available from Air Products), used in the examples as a 10% solution in xylene.

Examples 1–5

To prepare powder coating compositions, the blocked polyisocyanates, polyol and catalyst set forth in the following table (amounts in parts) were dissolved in solvent, mixed thoroughly to ensure homogeneity and poured into shallow aluminum trays. The solvent was then removed in a vacuum oven at approximately 50° C. and the resulting solid product was ground in a mortar and pestle to form a powder coating composition.

| | Examples | | | | |
|---|---|---|---|---|---|
| Components | 1 (Comp) | 2 (Comp) | 3 (Comp) | 4 | 5 |
| Polyol 1 | 35.4 | 35.4 | 35.4 | 35.4 | 35.4 |
| Blocked Polyisocyanate 1 | 14.7 | — | — | — | — |
| Blocked Polyisocyanate 2 | — | 14.0 | — | — | — |
| Blocked Polyisocyanate 3 | — | — | 13.5 | — | — |
| Blocked Polyisocyanate 4 | — | — | — | 14.3 | — |
| Blocked Polyisocyanate 5 | — | — | — | — | 14.3 |
| Solvent, MEK | 50 | 50 | 50 | 50 | 50 |
| Catalyst | 0.5 | 0.5 | 0.5 | 0.5 | 0.5 |

The rheological properties of the powder coating compositions were evaluated by parallel plate dynamic mechanical analysis. The Rheometrics RDAII was used with the disposable parallel plate attachment. A 200 psi transducer was used. A gap of 1 mm was used for all samples. The deformation was kept constant at 0.15% strain, and the frequency of deformation was 1 Hz. The temperature was ramped at 15° C./min. from 100° C. to 200° C., and then held at 200° C. for 15 min.

The results are shown in FIG. 1, which sets forth a plot of viscosity vs. temperature for the powder coating compositions of Examples 1–5. Examples 1, 2 and 3 show that changes of several % NCO had little or no effect on the melt viscosity reduction curve even, in the case of Example 3, when the melting point was so reduced that the resin fused on standing at ambient temperature. By comparison Examples 4 and 5 show a dramatic reduction in the melt viscosity at lower temperatures. This can be vitally important when attempting to formulate lower temperature curing powder coating compositions.

The storage stability of the blocked polyisocyanates was evaluated by differential scanning calorimetry. Perkin Elmer DSC 7 was used for the analysis. The samples were heated from 25° C. to 200° C. at 20° C./min. The coolant was ice and the purge gas was nitrogen. The following results demonstrate that the modifications with Alcohol 1 had no negative impact on the storage stability.

| Component | Melting Point (°C.) |
|---|---|
| Blocked Polyisocyanate 4 | 50.8 |
| Blocked Polyisocyanate 5 | 49.6 |
| Blocked Polyisocyanate 2 | 47.0 |
| Blocked Polyisocyanate 1 | 53.5 |

Examples 6–7

Powder coating compositions were prepared as described in Examples 1–5 from the blocked polyisocyanates, polyol and catalyst set forth in the following table (amounts in parts).

| Components | Examples | |
|---|---|---|
| | 6 (Comp) | 7 |
| Polyol 1 | 35.4 | 35.4 |
| Blocked Polyisocyanate 6 | 13.3 | — |
| Blocked Polyisocyanate 7 | — | 13.5 |
| Solvent | 100 | 150 |
| Catalyst | 0.5 | 0.5 |

Figure 2:
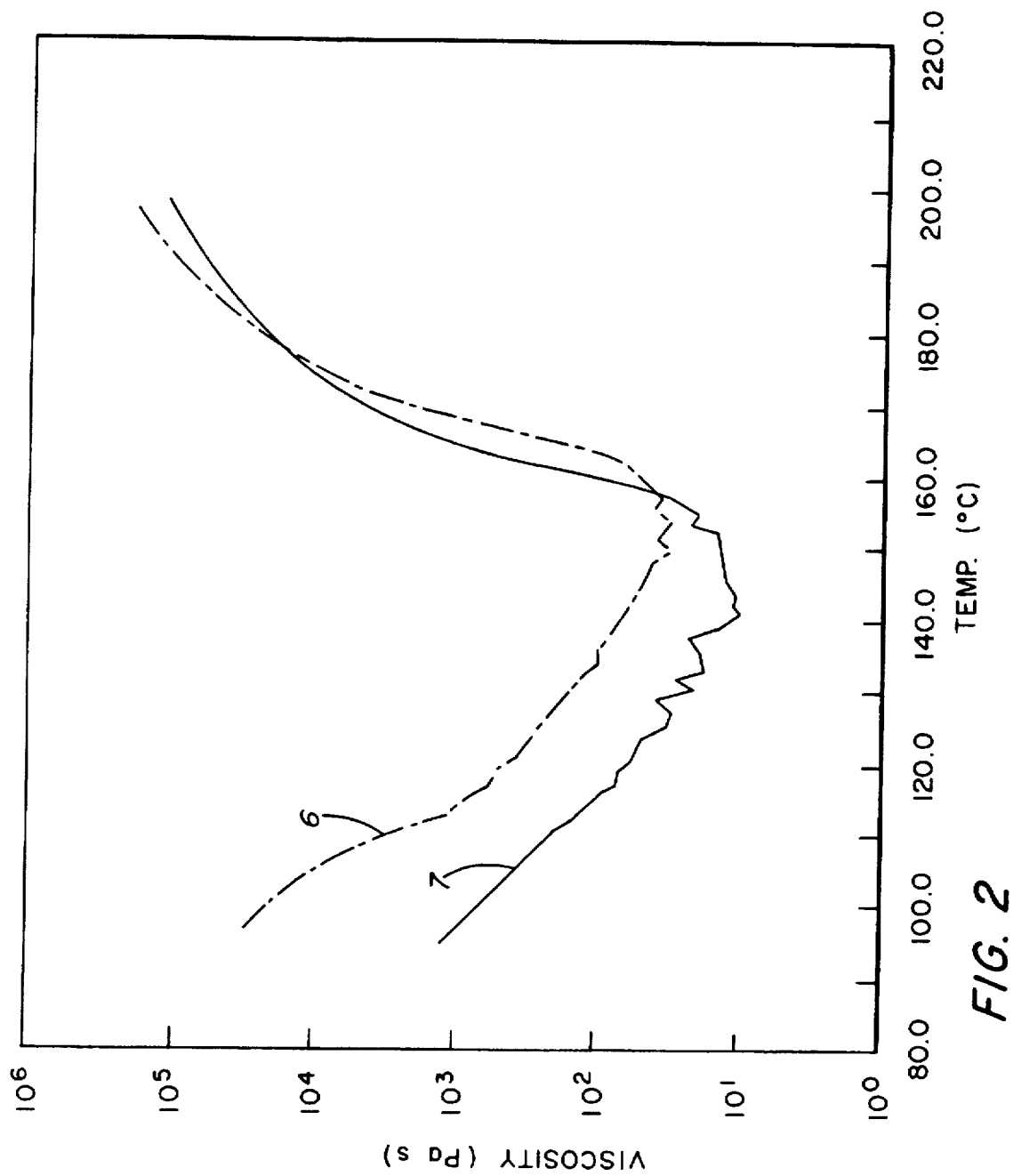
FIG. 2 is a graph showing a plot of viscosity vs. time for the powder coating compositions prepared in Examples 6–7.

The rheological properties of the powder coating compositions were similarly measured on a Rheometrics RDA 11 as described in Examples 1–5. The results are shown in FIG. 2, which sets forth a plot of viscosity vs. temperature for the powder coating compositions of Examples 6–7. The blocked polyisocyanate according to the invention, i.e., Example 7, had a much lower melt viscosity at lower temperatures as well as a lower minimum viscosity when compared to the blocked polyisocyanate that did not contain fluorine, i.e., Example 6. These results also confirm that the advantages of incorporating fluorine can also be obtained with more reactive, lower temperature curing, powder coating compositions. For example, compare the viscosity vs. temperature curve of Example 7 with those for Examples 1, 2 and 3.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition containing as binder
   A) a polyisocyanate component which contains blocked isocyanate groups, is present in powder form, is solid below 40° C. and liquid above 150° C., and contains one or more polyisocyanates
      i) having a blocked NCO content (calculated as NCO, MW 42) of 5 to 25% by weight of (cyclo) aliphatically-bound isocyanate groups and
      ii) containing fluorine (calculated as F, AW 19) in an amount of 0.01 to 20% by weight,
   wherein the preceding percentages are based on the solids content of the polyisocyanate mixture and
   B) a polyhydroxyl component comprising one or more high molecular weight polyols.

2. The powder coating composition of claim 1 wherein said polyisocyanate component additionally contains allophanate groups and optionally urethane or urea groups, provided that the number of equivalents of allophanate groups exceeds the number of equivalents of urethane and urea groups.

3. The powder coating composition of claim 1 which has an isocyanurate group content of at least 5% by weight, based on solids, and which contains less than 10% by weight, based on solids, of fluorine.

4. The powder coating composition of claim 2 which has an isocyanurate group content of at least 5% by weight, based on solids, and which contains less than 10% by weight, based on solids, of fluorine.

5. The powder coating composition of claim 3 wherein said polyisocyanates are prepared from 4,4'-diisocyanato-dicyclohexylmethane.

6. The powder coating composition of claim 4 wherein said polyisocyanates are prepared from 4,4'-diisocyanato-dicyclohexylmethane.

7. The powder coating composition of claim 1 wherein said polyisocyanates have a blocked NCO content (calculated as NCO, MW 42) of 5 to 25% by weight of (cyclo)aliphatically-bound isocyanate groups.

8. A powder coating composition containing as binder
   A) a polyisocyanate component which contains blocked isocyanate groups, is present in powder form, is solid below 40° C. and liquid above 150° C., and contains one or more polyisocyanates
      i) having a blocked NCO content (calculated as NCO, MW 42) of 5 to 25% by weight of (cyclo) aliphatically-bound isocyanate groups and
      ii) containing fluorine (calculated as F, AW 19) in an amount of 0.02 to 10% by weight,
   wherein the preceding percentages are based on the solids content of the polyisocyanate mixture and wherein fluorine is incorporated into said polyisocyanate component by reacting a polyisocyanate with a compound containing two or more carbon atoms, one or more hydroxyl groups and two or more fluorine atoms in the form of —CF$_2$— groups, and
   B) a polyhydroxyl component comprising one or more high molecular weight polyols.

9. The powder coating composition of claim 8 wherein said polyisocyanate component additionally contains allophanate groups and optionally urethane groups, provided that the number of equivalents of allophanate groups exceeds the number of equivalents of urethane groups.

10. The powder coating composition of claim 8 which has an isocyanurate group content of at least 5% by weight, based on solids.

11. The powder coating composition of claim 9 which has an isocyanurate group content of at least 5% by weight, based on solids.

12. The powder coating composition of claim 10 wherein said polyisocyanates are prepared from 4,4'-diisocyanato-dicyclohexylmethane.

13. The powder coating composition of claim 11 wherein said polyisocyanates are prepared from 4,4'-diisocyanato-dicyclohexylmethane.

14. A powder coating composition containing as binder
   A) a polyisocyanate component which contains blocked isocyanate groups, is present in powder form, is solid below 40° C. and liquid above 150° C., and contains one or more polyisocyanates
      i) having a blocked NCO content (calculated as NCO, MW 42) of 5 to 25% by weight of (cyclo) aliphatically-bound isocyanate groups and
      ii) containing fluorine (calculated as F, AW 19) in an amount of 0.05 to 7% by weight,
   wherein the preceding percentages are based on the solids content of the polyisocyanate mixture and wherein fluorine is incorporated into said polyisocyanate component by reacting a polyisocyanate with a compound containing two or more carbon atoms, one hydroxyl group and two or more fluorine atoms in the form of —CF$_2$— groups, and
   B) a polyhydroxyl component comprising one or more high molecular weight polyols.

15. The powder coating composition of claim 14 wherein said polyisocyanate component additionally contains allophanate groups and optionally urethane groups, provided that the number of equivalents of allophanate groups exceeds the number of equivalents of urethane groups.

16. The powder coating composition of claim 14 which has an isocyanurate group content of at least 5% by weight, based on solids.

17. The powder coating composition of claim 15 which has an isocyanurate group content of at least 5% by weight, based on solids.

18. The powder coating composition of claim 16 wherein said polyisocyanates are prepared from 4,4'-diisocyanato-dicyclohexylmethane.

19. The powder coating composition of claim 17 wherein said polyisocyanates are prepared from 4,4'-diisocyanato-dicyclohexylmethane.

20. A coated substrate coated with the powder coating composition of claim 1.

* * * * *